United States Patent
Kinoshita et al.

(10) Patent No.: US 8,020,463 B2
(45) Date of Patent: Sep. 20, 2011

(54) ROTATION/LINEAR MOTION CONVERTING MECHANISM

(75) Inventors: Yasuo Kinoshita, Aichi-ken (JP); Toshiaki Hamaguri, Toyota (JP); Motohiro Tsuzuki, Toyota (JP); Koji Kasahara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 340 days.

(21) Appl. No.: 11/989,014

(22) PCT Filed: Aug. 23, 2006

(86) PCT No.: PCT/JP2006/317028
§ 371 (c)(1),
(2), (4) Date: Jan. 18, 2008

(87) PCT Pub. No.: WO2007/024006
PCT Pub. Date: Mar. 1, 2007

(65) Prior Publication Data
US 2009/0114048 A1 May 7, 2009

(30) Foreign Application Priority Data
Aug. 25, 2005 (JP) .................. 2005-244566

(51) Int. Cl.
*F16H 1/24* (2006.01)
*F16H 55/02* (2006.01)
(52) U.S. Cl. .................. 74/424.92; 74/424.91
(58) Field of Classification Search .............. 74/424.91, 74/424.92
See application file for complete search history.

(56) References Cited

U.S. PATENT DOCUMENTS

| 2,683,379 | A | * | 7/1954 | Strandgren | 74/424.92 |
| 3,173,304 | A | * | 3/1965 | Strandgren | 74/424.93 |
| 3,406,584 | A | * | 10/1968 | Roantree | 74/424.92 |
| 3,595,094 | A | | 7/1971 | Lemor | |
| 4,470,646 | A | | 9/1984 | Fuchsluger | |

(Continued)

FOREIGN PATENT DOCUMENTS

DE 21 09 640 A1 9/1972

(Continued)

OTHER PUBLICATIONS

European Office Action issued Oct. 27, 2009 in European Patent Application No. 06797004.6.

(Continued)

*Primary Examiner* — Justin Krause
(74) *Attorney, Agent, or Firm* — Oliff & Berridge, PLC

(57) ABSTRACT

A rotation/linear motion converting mechanism includes a shaft 1 having an external thread 1a on an outer circumferential surface, a nut 2 having an internal thread 2a on an inner circumferential surface, and a roller 3 arranged between the outer circumferential surface of the shaft 1 and the inner circumferential surface of the nut 2. The roller has a thread 3a threaded to the external thread 1a and the internal thread 2a. A spur gear 3b and a spur gear 3c are provided in portions of the roller 3. A spur gear 1b is provided in a portion of the shaft 1. The spur gear 1b is meshed with the spur gear 3b of the roller 3. Internal teeth 4a are provided in a portion of the nut 2. The internal teeth 4a are meshed with the spur gear 3 of the roller 3. This improves the lead accuracy of the shaft 1 when the nut 2 is rotated.

16 Claims, 5 Drawing Sheets

U.S. PATENT DOCUMENTS

| | | | |
|---|---|---|---|
| 4,615,229 A | 10/1986 | Granbom | |
| 5,968,563 A | 10/1999 | Hehl | |
| 6,026,696 A * | 2/2000 | Hehl | 74/424.92 |
| 6,155,817 A | 12/2000 | Hehl | |
| 6,318,516 B1 | 11/2001 | Zernickel et al. | |
| 7,651,436 B2 | 1/2010 | Sugitani | |
| 2004/0031341 A1* | 2/2004 | Benoit | 74/89.34 |
| 2004/0082431 A1 | 4/2004 | Maydew | |
| 2007/0238571 A1* | 10/2007 | Sugitani | 475/227 |
| 2008/0196529 A1 | 8/2008 | Sugitani | |

FOREIGN PATENT DOCUMENTS

| | | |
|---|---|---|
| DE | 85 13 093 U1 | 8/1986 |
| EP | 0 157 747 A1 | 10/1985 |
| EP | 0 260 368 A1 | 3/1988 |
| EP | 1 918 612 A1 | 5/2008 |
| GB | 819978 | 9/1959 |
| GB | 1021655 | 3/1966 |
| JP | A-47-031740 | 8/1972 |
| JP | A-57-69157 | 4/1982 |
| JP | A-59-147151 | 8/1984 |
| JP | A-10-196757 | 7/1998 |
| JP | A-2000-500215 | 1/2000 |
| JP | A-2000-110908 | 4/2000 |
| JP | A-2001-521119 | 11/2001 |
| JP | A-2007-024248 | 2/2007 |
| SU | 488038 | 1/1976 |
| SU | 1497423 A1 | 12/1987 |
| WO | WO 02/40346 A1 | 5/2002 |
| WO | WO 2004/094870 A1 | 11/2004 |
| WO | WO 2005/124188 A1 | 12/2005 |

OTHER PUBLICATIONS

Dec. 30, 2009 Official Action issued in Russian Application No. 2008111161/11 (012075), PCT/JP2006/317028 (with translation).

May 18, 2010 Decision on Grant issued in Russian Patent Application No. 2008111161/11 (012075) (with translation).

* cited by examiner

L1: Target Value (Design Value)
L2: Rotation/Linear Motion Converting Mechanism Of This Embodiment
L3: Rotation/Linear Motion Converting Mechanism Without Gear (At Nut Forward Rotation)
L4: Rotation/Linear Motion Converting Mechanism Without Gear (At Nut Reverse Rotation)

ROTATION/LINEAR MOTION CONVERTING MECHANISM

FIELD OF THE INVENTION

The present invention relates to a rotation/linear motion converting mechanism which converts a rotation to a linear motion or a linear motion to a rotation.

BACKGROUND OF THE INVENTION

As this type of conventional rotation/linear motion converting mechanism, a mechanism using a roller screw described in Japanese Laid-Open Patent Publication No. 10-196757, for example, has been known.

This mechanism is provided with a shaft having a thread on the outer circumferential surface, a nut having a thread on the inner circumferential surface, and rollers interposed between the outer circumferential surface of the shaft and the inner circumferential surface of the nut and screwed with each of the above threads. The nut and the rollers are meshed with each other by a gear. When the above nut is rotated, the rollers rotate and revolves around the shaft, that is, perform a sun-and-planet motion, while the shaft screwed with the thread of the rollers makes a linear motion in the axial direction.

A lead in the above rotation/linear motion converting mechanism (stroke quantity of a shaft per rotation of a nut) is determined by the number of threads provided on the shaft, nut and rollers, respectively and reduction gear ratio of the rotation/linear motion converting mechanism. Among them, the reduction gear ratio is determined by a ratio of effective diameters of the respective threads, but the actual effective diameters of the respective threads might be varied due to machining accuracy of the thread or changed due to abrasion on the contact surface between the threads to be screwed together, and a stable constant reduction gear ratio is difficult to be obtained.

Also, in the mechanism described in the above document, since the position of a center axis of the shaft with respect to the center axis of the nut and the position of the revolution axis of the rollers with respect to the center axis of the nut are determined by meshing of the threads, the center axis of the shaft and the revolution axis of the rollers are easily displaced from the center axis of the nut. If the center axis of the shaft or the revolution axis of the rollers is displaced from the center axis of the nut in this way, the position of the contact surface of each thread is changed, which causes change in the actual effective diameter of each thread and a stable constant reduction gear ratio cannot be obtained in this case, either.

If a stable constant reduction gear ratio cannot be obtained in a rotation/linear motion converting mechanism in this way, it becomes difficult to achieve the above lead according to a design value, which deteriorates lead accuracy.

SUMMARY OF THE INVENTION

Accordingly, it is an objective of the present invention to provide a rotation/linear motion converting mechanism which improves the lead accuracy.

To achieve the foregoing objective and in accordance with one aspect of the present invention, a rotation/linear motion converting mechanism including a shaft having a thread on an outer circumferential surface, a nut having a thread on an inner circumferential surface, and a roller arranged between the outer circumferential surface of the shaft and the inner circumferential surface of the nut is provided. The roller has a thread threaded to the threads of the shaft and the nut. The rotation/linear motion converting mechanism converts rotation of one of the shaft and the nut to linear motion of the other. The mechanism includes a first gear provided in a portion of the roller, a second gear provided in a portion of the shaft, and a third gear provided in a portion of the nut. The second gear is meshed with the first gear, and the third gear is meshed with the first gear.

In accordance with another aspect of the present invention, a rotation/linear motion converting mechanism including a shaft having a thread on an outer circumferential surface, a nut having a thread on an inner circumferential surface, and a roller arranged between the outer circumferential surface of the shaft and the inner circumferential surface of the nut is provided. The roller has a thread threaded to the threads of the shaft and the nut. The rotation/linear motion converting mechanism converts rotation of one of the shaft and the nut to linear motion of the other. The mechanism includes a first support member fixed to the inner circumferential surface of the nut, a plurality of retainers each having an annular shape surrounding the shaft, and a second support member fixed to the inner circumferential surface of the nut. The first support member supports the outer circumferential surface of the shaft. The retainers support both ends of the roller in an axial direction, respectively. The second support member rotatably supports the outer circumferential surface of at least one of the retainers.

DETAILED DESCRIPTION OF THE PREFERRED EMBODIMENTS

First Embodiment

A rotation/linear motion converting mechanism according to a first embodiment of the present invention will be described below referring to FIGS. 1 to 4.

Figure 1:
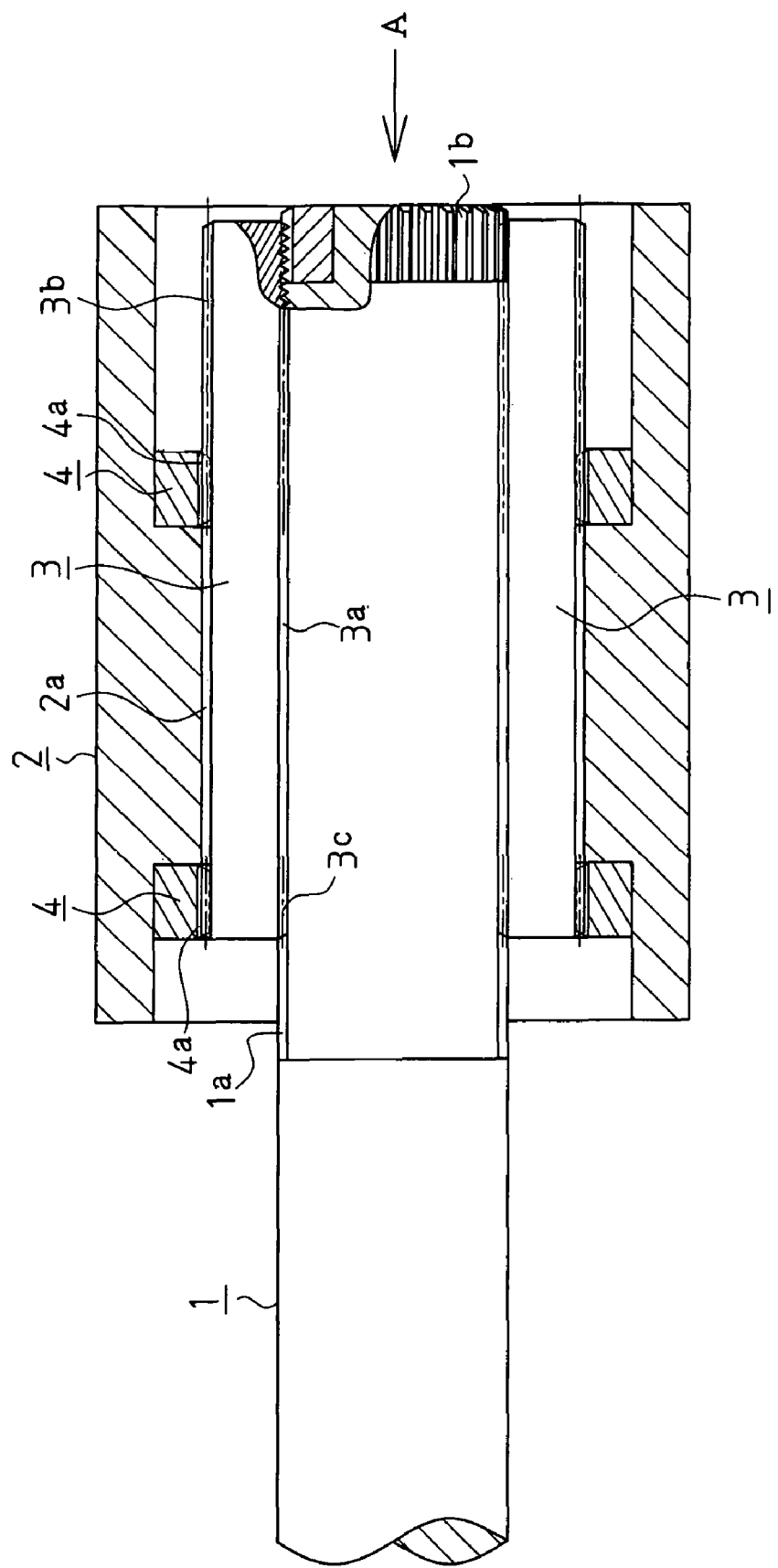
FIG. 1 is a cross-sectional view schematically showing a rotation/linear motion converting mechanism according to a first embodiment of the present invention.

FIG. 1 is a cross-sectional view as viewed in the axial direction showing the rotation/linear motion converting mechanism according to this embodiment.

As shown in FIG. 1, the rotation/linear motion converting mechanism comprises a shaft 1 having a thread on its outer circumferential surface, a nut 2 provided on the outside of the shaft 1 and having a thread on its inner circumferential surface, a plurality of rollers 3 interposed between the outer circumferential surface of the shaft 1 and the inner circumferential surface of the nut 2 and having a thread screwed with the thread of the shaft 1 and the thread of the nut 2, ring gears 4 provided on the inner circumferential surface of the nut 2. The rotation/linear motion converting mechanism is often referred to as a roller-screw mechanism converting the rotational motion of the nut 2 to the linear motion of the shaft 1. The respective components will be described below in detail.

An external thread 1a is formed on the outer circumferential surface of the shaft 1, and the external thread 1a is a multiple right-hand thread, for example.

At an end of the shaft 1 in the axial direction, a spur gear 1b having substantially the same outer diameter as that of the shaft 1 is provided. The spur gear 1b is made of a member separate from the shaft 1, and the spur gear 1b is fixed to the shaft 1 by fitting the inner circumferential surface of the spur gear 1b to a projection portion provided at the end of the shaft 1. The same teeth as those of the spur gear 1b may be directly formed on the outer circumferential surface of the shaft 1. The spur gear 1b forms a second gear.

Figure 2:
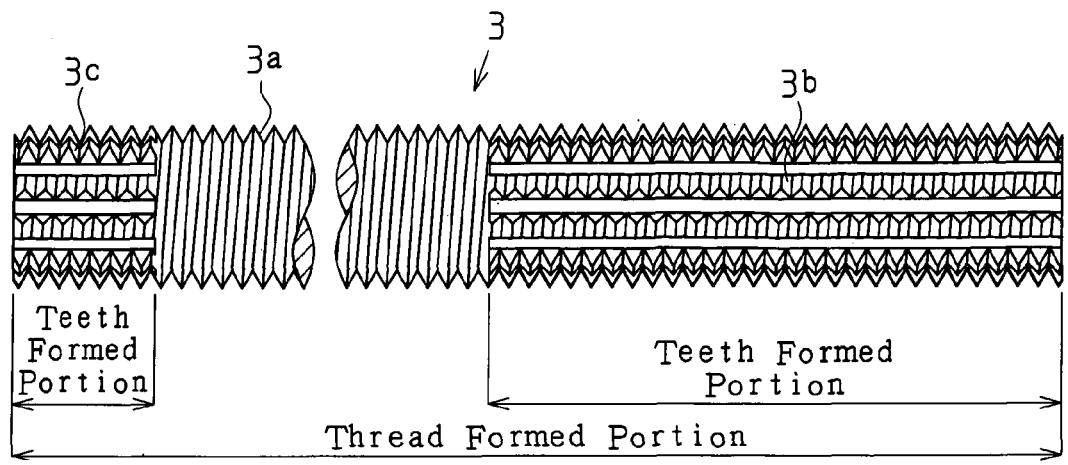
FIG. 2 is a schematic diagram showing a structure of a roller of the first embodiment.

FIG. 2 shows the shape of the roller 3. As shown in FIGS. 1 and 2, each roller 3 is in the cylindrical shape and a thread 3a screwed with the external thread 1a of the shaft 1 is formed on the entire outer circumferential surface in its axial direction. The thread 3a is a single left-hand thread, for example. Also, a plurality of (nine in this embodiment) rollers 3 are disposed with an even pitch surrounding the outer circumferential surface of the shaft 1. Moreover, a spur gear 3b and a spur gear 3c are provided at a part of each roller 3.

The spur gear 3b is integrally formed on the outer circumferential surface of the end on the side opposed to the spur gear 1b of the shaft 1 in both ends of each roller 3 in the axial direction so that it is meshed with the spur gear 1b. Moreover, the spur gear 3b is provided corresponding to a range where the spur gear 1b of the shaft 1 is relatively moved in the axial direction with respect to the roller 3. Also, the teeth of each spur gear 3b are formed at a portion on which the thread 3a is formed (thread formed portion shown in FIG. 2) in each roller 3. Machining of the portions where the thread 3a and the teeth of the spur gear 3b are formed (teeth formed portion shown in FIG. 2) may be performed in such a way that the teeth of the spur gear 3b are formed after formation of the thread 3a, the thread 3a is formed after formation of the teeth of the spur gear 3b or the thread 3a and the teeth of the spur gear 3b are formed at the same time, for example.

The spur gear 3c is integrally formed on the outer circumferential surface on the end opposite to the end where the above spur gear 3b is provided in both ends of each roller 3 in the axial direction. The spur gear 3c is meshed with the above ring gears 4. Also, as shown in FIG. 2, the teeth of the spur gear 3c are formed at a portion where the thread 3a is formed (thread formed portion shown in FIG. 2) in each roller 3. Machining of the portions where the thread 3a and the teeth of the spur gear 3c are formed (teeth formed portion shown in FIG. 2) may be performed in the same mode as for the spur gear 3b.

The spur gear 3b and the spur gear 3c may be members separate from the roller 3, and the spur gear 3b and the spur gear 3c may be assembled to the ends of the roller 3, respectively. Also, blanks (gear member before gear cutting) of the spur gear 3b and the spur gear 3c may be assembled at the ends of the roller 3, respectively, and then, the thread 3a and the teeth of the respective gears may be formed. The spur gears 3b and 3c form a first gear.

An internal thread 2a screwed with the thread 3a of each roller 3 is formed on the inner circumferential surface of the above nut 2, and the internal thread 2a is a multiple left-hand thread with threads in the number different from that of the external thread 1a, for example.

Moreover, a gear to be meshed with the spur gear 3b and the spur gear 3c of each roller 3, respectively, is provided at a part of the inner circumferential surface of the nut 2. More specifically, on the inner circumferential surface of the nut 2, two above-mentioned ring gears 4 to be meshed with the spur gears 3b and the spur gears 3c are provided.

Each ring gear 4 is formed in the annular state, and its outer circumferential surface is fixed to the inner circumferential surface of the nut 2. Also, on its inner circumferential surface, spur type internal teeth 4a to be meshed with the teeth of the spur gears 3b and the spur gears 3c are formed, and the inner diameter of the internal teeth 4a is set substantially the same as the inner diameter of the internal thread 2a formed on the nut 2. The ring gears 4 are formed at both ends of the internal thread 2a, respectively. The internal teeth 4a form a third gear.

When the ratio among the effective diameter of the external thread 1a of the shaft 1, the effective diameter of the thread 3a of each roller 3 and the effective diameter of the internal thread 2a of the nut 2 is represented by "$\alpha{:}\beta{:}\lambda$", the ratio among the numbers of the respective gears are set so that the number of teeth of the spur gear 1b of the shaft 1, the numbers of respective teeth of the spur gear 3b and the spur gear 3c of each roller 3 and the number of teeth of the internal teeth 4a of each ring gear 4 is also represented by "$\alpha{:}\beta{:}\lambda$". By this, the reduction gear ratio by screwing of the respective threads and the reduction gear ratio of meshing of the respective gears are made to match each other.

In the rotation/linear motion converting mechanism of the so constructed embodiment, operation in the case where the nut 2 is supported to be rotatable and immovable in the axial direction and the shaft 1 is supported to be not rotatable and movable in the axial direction, for example, will be described below.

If the nut 2 is rotated in this case, the rollers 3 are rotated and revolved around the shaft 1 while they are screwed with the internal thread 2a of the nut 2 and the external thread 1a of the shaft 1. That is, the motion is a sun-and-planet motion and the shaft 1 makes a linear motion in its axial direction by a lead determined according to the reduction gear ratio of the rotation/linear motion converting mechanism and the numbers of threads of the respective threads.

If the reduction gear ratio among the shaft 1, each roller 3 and the nut 2 is set at "3:1:5" and the numbers of threads of the external thread 1a of the shaft 1, the thread 3a of each roller 3 and the internal thread 2a of the nut 2 is set at "4 threads:1 thread:5 threads", when the nut 2 is rotated once, a stroke amount of the shaft 1 is a single pitch of the external thread 1a. That is, the lead at this time is the single pitch of the external thread 1a.

Figure 3:
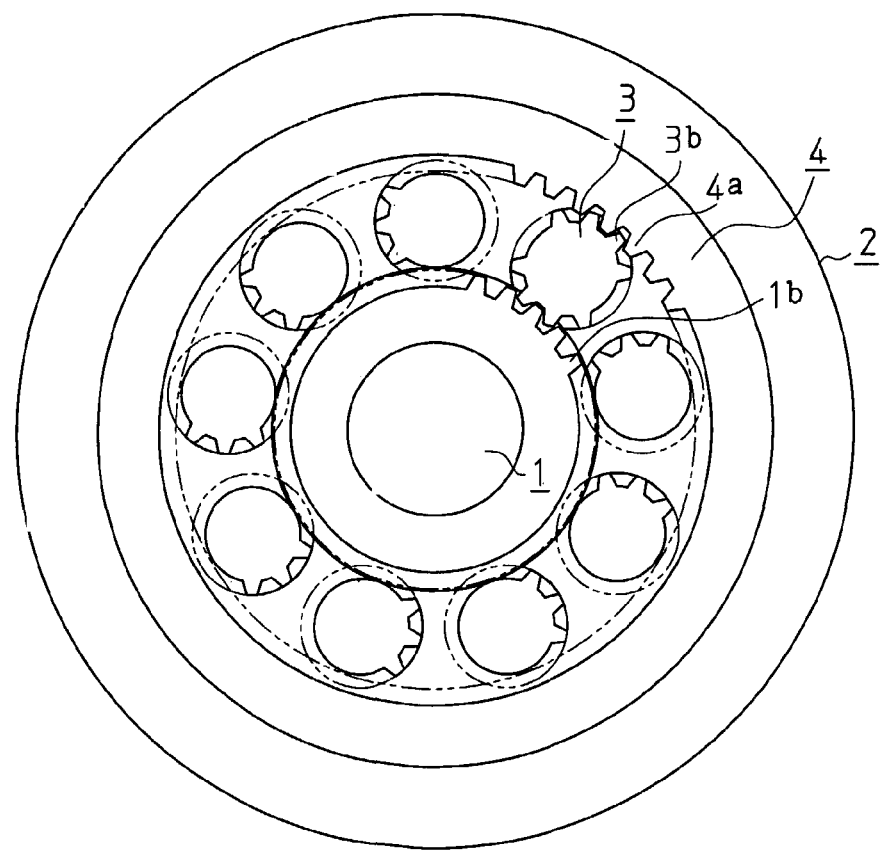
FIG. 3 is a schematic diagram (view on arrow A of FIG. 1), showing the structure of the rotation/linear motion converting mechanism as viewed in a direction of arrow A in FIG. 1.

As shown in FIG. 3 showing the structure of the rotation/linear motion converting mechanism as viewed along the arrow A in FIG. 1 or in FIG. 1, in this embodiment, the internal teeth 4a of each ring gear 4 fixed to the nut 2 are meshed with the spur gear 3c provided on each roller 3, and the spur gear 3b provided on the roller 3 is meshed with the spur gear 1b provided at a part of the shaft 1. Therefore, the reduction gear ratio of the rotation/linear motion converting mechanism is determined by meshing between the respective gears provided at the shaft 1, the nut 2, and the rollers 3, respectively. Thus, even if the actual effective diameters of the respective threads provided at the shaft 1, the nut 2 or the rollers 3 is varied due to machining accuracy of the thread or changed due to abrasion or the like on the contact surfaces between the threads to be screwed, the reduction gear ratio of the rotation/linear motion converting mechanism can be maintained at a stable constant value without being affected by such effective diameters of the threads. The stroke amount of the shaft 1 when the nut 2 is rotated once, that is, the lead can be maintained at a stable constant value, and the lead accuracy can be improved.

Figure 4:
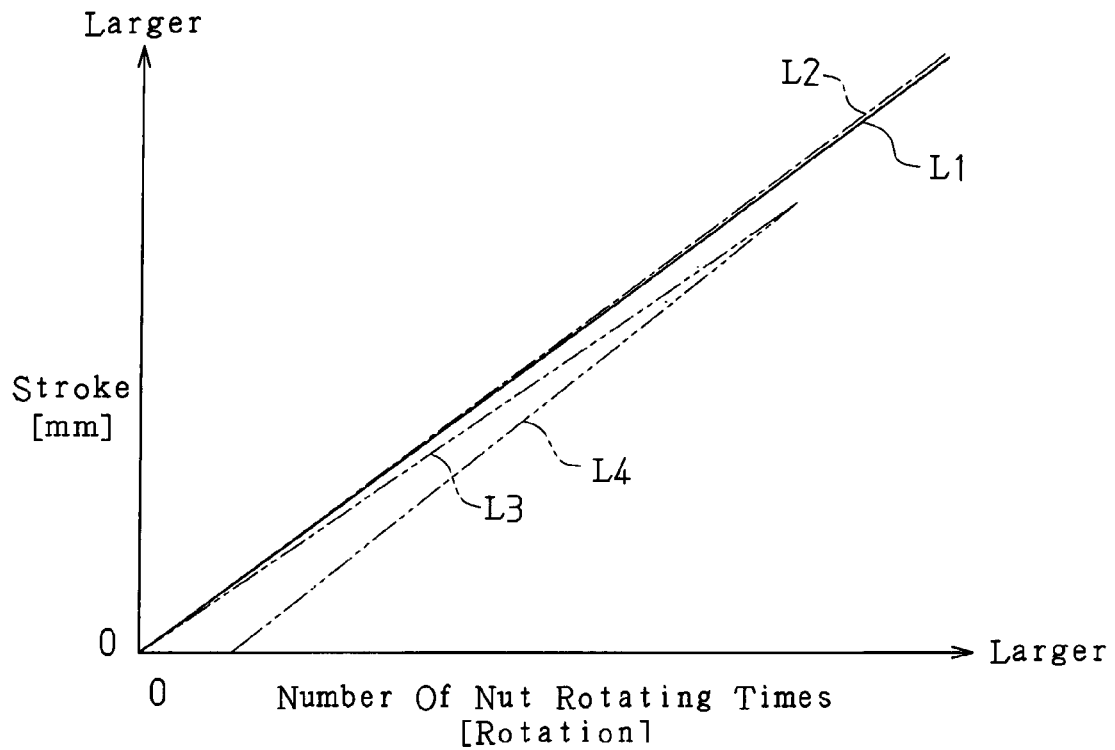
FIG. 4 is a graph showing a stroke accuracy of the rotation/linear motion converting mechanism according to the first embodiment.

FIG. 4 shows a stroke accuracy of the rotation/linear converting mechanism according to the embodiment. Each line shown in FIG. 4 indicates the stroke amount of the shaft 1 when the nut is rotated. A solid line represented by line L1 indicates a stroke amount in design of the rotation/linear motion converting mechanism according to this embodiment, a target value, so to speak. A chain line represented by line L2 indicates an actual stroke amount of the rotation/linear motion converting mechanism according to this embodiment. A two-dot chain line represented by line L3 indicates a stroke amount, or a feed amount, when the nut is rotated in the forward direction in the rotation/linear motion converting mechanism without a gear in which the shaft, the roller and the nut are screwed together only by a screw. A two-dot chain line represented by line L4 indicates a stroke amount when the nut is reversed after forward rotation in the rotation/linear motion converting mechanism without a gear, which is, a return amount.

In the rotation/linear motion converting mechanism without a gear, the reduction gear ratio becomes different from a design value due to influence of the effective diameter of each thread and the value itself becomes unstable, which easily deteriorates the lead accuracy. Therefore, as shown in FIG. 4, the target value (line L1) and the actual stroke amount (line L3 and line L4) are largely displaced, and it becomes difficult to achieve required stroke accuracy. In the rotation/linear motion converting mechanism without a gear, it was confirmed that, even if the number of rotating times of the nut is the same, the stroke amount is different between the nut forward rotation (line L3) and the nut reverse rotation (line L4).

On the other hand, in the rotation/linear motion converting mechanism of this embodiment, the reduction gear ratio of the rotation/linear motion converting mechanism can be maintained at a stable constant value, that is, a design value, as mentioned above, and the lead accuracy can be improved. Therefore, the actual stroke amount (line L2) and the target value (line L1) substantially match each other as shown in FIG. 4, and required stroke accuracy can be achieved. In this way, with the rotation/linear motion converting mechanism of this embodiment, the stroke accuracy can be improved as compared with the above rotation/linear motion converting mechanism without a gear.

In the meantime, when the rotation of the nut 2 is converted so that the shaft 1 makes a linear motion, the rollers 3 and the shaft 1 are relatively moved with respect to each other in the axial direction of the shaft 1, but in this embodiment, the spur gear 3b of each roller 3 is provided corresponding to the range where the spur gear 1b of the shaft 1 is relatively moved with respect to the rollers 3. Therefore, the rollers 3 and the shaft 1 can be relatively moved with respect to each other, while meshing between the spur gear 3b of each roller 3 and the spur gear 1b of the shaft 1 is maintained. Thus, even if the shaft 1 and the rollers 3 are meshed by a gear, the rollers 3 and the shaft 1 can be relatively moved with respect to each other.

Moreover, in this embodiment, the ring gears 4 on each of which the internal teeth 4a to be meshed with the spur gears 3b and the spur gears 3c are formed are prepared as the gears on the nut 2 to be meshed with the spur gears 3b and the spur gears 3c of the rollers 3, and the ring gears are provided on the inner circumferential surface of the nut 2. Therefore, the gear can be provided more easily on the nut 2 as compared with the case where the gear is directly formed on the inner circumferential surface of the nut 2.

As mentioned above, according to this embodiment, the following advantages are achieved.

(1). In the rotation/linear motion converting mechanism comprising a shaft 1 having the external thread 1a on its outer circumferential surface, the nut 2 having the internal thread 2a on its inner circumferential surface, and the rollers 3 interposed between the outer circumferential surface of the shaft 1 and the inner circumferential surface of the nut 2. Each roller 3 has the thread 3a to be screwed with the external thread 1a and the internal thread 2a, respectively. Gears (the spur gear 3b and the spur gear 3c) are provided at a part of each roller 3. A gear (the spur gear 1b) meshed with the gear (the spur gear 3b) of each roller 3 is provided at a part of the shaft 1 and a gear (internal teeth 4a) meshed with the gear (the spur gear 3c) of each roller 3 at a part of the nut 2, respectively.

Therefore, the reduction gear ratio of the rotation/linear motion converting mechanism is determined by meshing between the respective gears provided at the shaft 1, the nut 2, and the rollers 3. Thus, the reduction gear ratio can be maintained at a stable constant value, which improves the lead accuracy.

(2) The gear (the spur gear 3b) of each roller 3 which can be meshed with the gear (the spur gear 1b) of the shaft 1 is provided corresponding to a range where the gear (the spur gear 1b) of the shaft 1 is relatively moved with respect to the roller 3. Therefore, even if the shaft 1 and the rollers 3 are meshed by a gear, the rollers 3 and the shaft 1 can be relatively moved.

(3) On the inner circumferential surface of the nut 2, the ring gears 4 are provided on each of which the internal teeth 4a forming the gear of the nut 2 are formed as the gear of the nut 2 meshed with the gear (the spur gear 3b and the spur gear 3c) of each roller 3. Therefore, the gear can be provided more easily on the nut 2 as compared with the case where the gear is directly formed on the inner circumferential surface of the nut 2.

Second Embodiment

Next, a rotation/linear motion converting mechanism according to a second embodiment of the present invention will be described referring to FIGS. 5 to 7.

Figure 5:
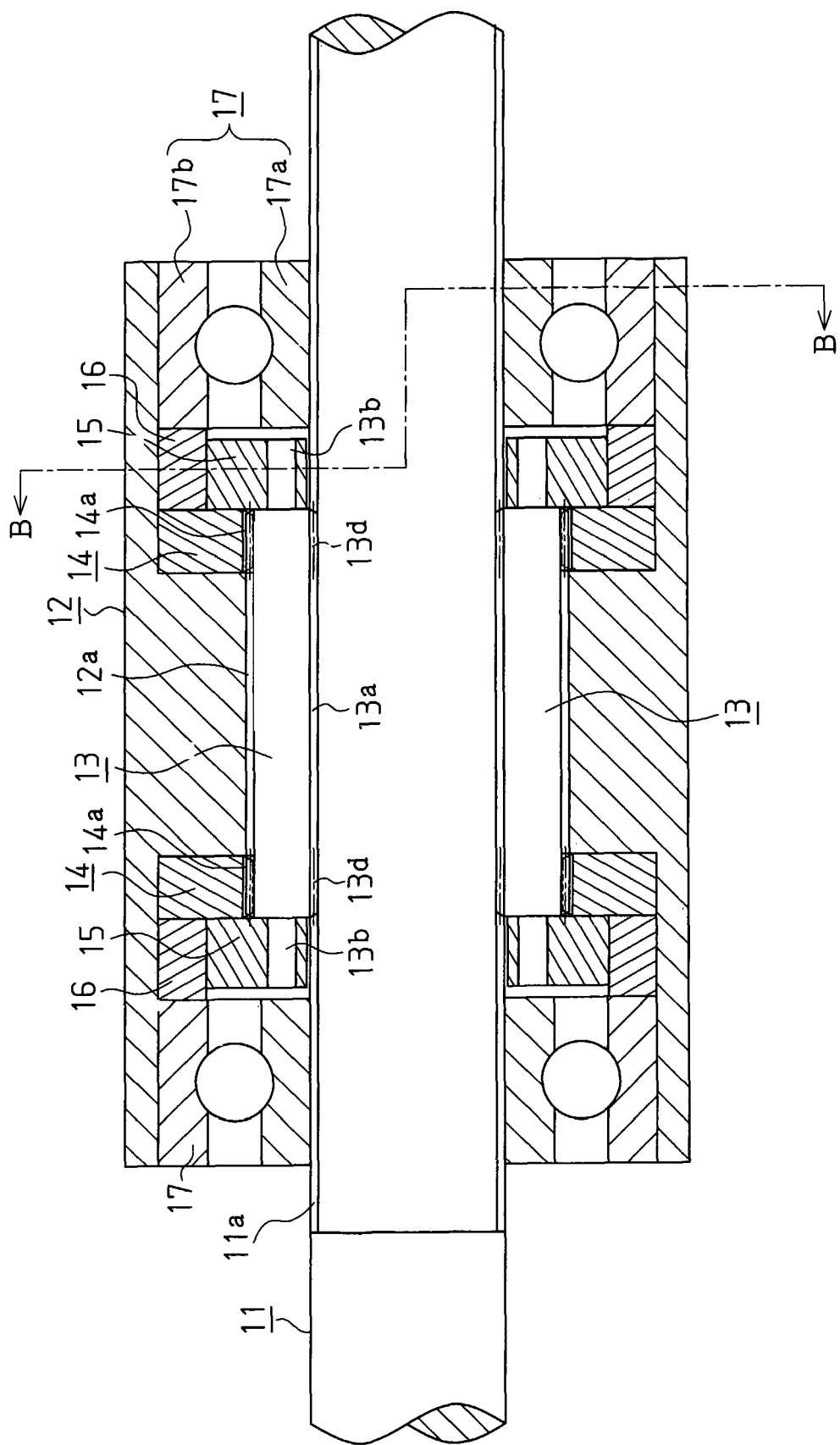
FIG. 5 is a cross-sectional view schematically showing a rotation/linear motion converting mechanism according to a second embodiment of the present invention.

FIG. 5 schematically shows a cross-sectional view of the structure of the rotation/linear motion converting mechanism according to this embodiment in the axial direction.

As shown in FIG. 5, the rotation/linear motion converting mechanism of this embodiment comprises a shaft 11, a nut 12 provided outside of the shaft 11, a plurality of rollers 13 interposed between the outer circumferential surface of the shaft 11 and the inner circumferential surface of the nut 12 and rotating and revolving around the shaft 11, ring gears 14 provided on the inner circumferential surface of the nut 12. Retainers 15 supporting both ends of the rollers 13 in an axial direction, respectively, bushings 16 supporting the retainers 15, and bearings 17 supporting the shaft 11 are provided, and the rotation/linear motion converting mechanism also forms a roller-screw mechanism converting a rotation of the nut 12 to a linear motion of the shaft 11. Each of the above components will be described below in detail.

An external thread 11a is formed on the outer circumferential surface of the shaft 11, and the external thread 11a is a multiple right-hand thread, for example.

Figure 6:
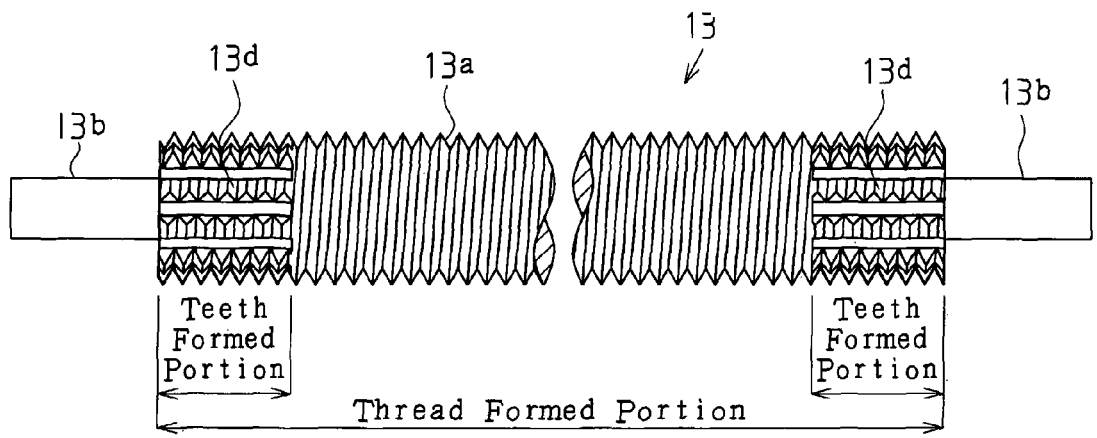
FIG. 6 is a schematic diagram showing the structure of a roller of the second embodiment.

FIG. 6 shows the shape of the roller 13. As shown in FIGS. 5 and 6, each roller 13 is in the cylindrical shape and comprises a thread portion on which a thread 13a screwed with the external thread 11a of the shaft 11 is formed on the entire outer circumferential surface in its axial direction and respective shafts 13b provided at both ends of the thread portion. The thread 13a is a single left-hand thread for example. Also, the multiple rollers 13 are disposed (nine in this embodiment) with an equal pitch surrounding the outer circumferential surface of the shaft 11. Each of the respective shafts 13b provided at both ends of each roller 13 is rotatably supported by the above annular retainers 15 surrounding the shaft 11, respectively. By the retainers 15, the disposed positions (the above equal pitch) of the respective rollers 13 are maintained in the circumferential direction of the shaft 11.

On the outer circumferential surface at both ends of the thread portion of each roller 13, spur gears 13d meshed with the above ring gears 14 are integrally provided, respectively. That is, the teeth of each of the spur gears 13d are formed at a portion where the thread 13a is formed in the roller 13 (thread formed portion shown in FIG. 6) as shown in FIG. 6. Machining of the portion where the thread 13a and the teeth of the spur gear 13d are formed (teeth formed portion shown in FIG. 6) can be made in the similar manner to the machining of the above spur gear 3b and the spur gear 3c.

An internal thread 12a screwed with the threads 13a of each roller 13 is formed on the inner circumferential surface of the above nut 12, and the internal thread 12a is a multiple left-hand thread with the number of threads different from that of the external thread 11a, for example.

Also, at a part of the inner circumferential surface of the nut 12, a gear meshed with each of the spur gears 13d of the rollers 13 is provided. More specifically, on the inner circumferential surface of the nut 12, two above ring gears 14 meshed with the respective spur gears 13d are provided.

Each of the ring gears 14 is made in the annular shape, and the outer circumferential surface is fixed to the inner circumferential surface of the nut 12. Moreover, spur-shaped internal teeth 14a meshed with the teeth of the spur gears 13d are formed on its inner circumferential surface, and the inner diameter of the internal teeth 14a is substantially equal to the inner diameter of the internal thread 12a formed on the nut 12. The ring gears 14 are provided at both ends of the internal thread 12a, respectively.

When the ratio between the effective diameter of the thread 13a of each roller 13 and the effective diameter of the internal thread 12a of the nut 12 is set as "β:λ", the numbers of teeth of the respective gears are set so that the ratio between the numbers of teeth of the spur gear 13d of each roller 13 and the internal teeth 14a of each ring gear 14, is also "β:λ". By this, the reduction gear ratio by screwing of the respective threads is matched with the reduction gear ratio by meshing of the respective gears.

The outer circumferential surface of each retainer 15 is rotatably supported by the inner circumferential surface of a bushing 16 functioning as a slide bearing, and the bushing 16 is press-fitted in the inner circumferential surface of the nut 12. As a mode to fix the bushings 16 to the nut 12, any mode other than press-fitting may employed as appropriate. Also, the bushings 16 form second support members. The respective retainers 15 provided at both ends of the roller 13 in this way are rotated within the nut 12 according to the revolution of the rollers 13 while sliding with the bushings 16.

At both ends in the axial direction in the inner circumferential surface of the above nut 12, the bearings 17 are press-fitted, respectively, and the shaft 11 is pivotally supported by these respective bearings 17. More specifically, the bearings 17 are anti-friction bearings, and the outer circumferential surface of the shaft 11 is supported by inner rings 17a of the bearings 17. The inner ring 17a of each bearing 17 and the shaft 11 are in the clearance fit state so that the shaft 11 can be moved inside the inner ring 17a. An outer ring 17b of each bearing 17 is press-fitted in the inner circumferential surface of the nut 12. As a mode to fix the outer rings 17b to the nut 12, any mode other than press fitting may be employed as appropriate. Moreover, these bearings 17 form first support members.

In the so constructed rotation/linear motion converting mechanism of this embodiment, operation of a case where the nut 12 is supported to be rotatable and immovable in the axial direction and the shaft 11 is supported to be not rotatable and to be movable in the axial direction, for example, will be described below.

When the nut 12 is rotated in this case, the rollers 13 rotate and revolve around the shaft 11, while they are screwed with the internal thread 12a of the nut 12 and the external thread 11a of the shaft 11 and meshed with the respective spur gears 13d and the internal teeth 14a of the ring gears 14. That is, the motion is a sun-and-planet motion, and the shaft 11 makes a linear motion in the axial direction by a lead determined by the reduction, gear ratio of the rotation/linear motion converting mechanism and the number of threads of the respective threads.

Suppose that the effective diameters of the external thread 11a of the shaft 11, the thread 13a of each roller 13 and the internal thread 12a of the nut 12 are set at "3:1:5", for example, so that the reduction gear ratio of the shaft 11, each roller 13 and the nut 12 is to be set at "3:1:5". When the numbers of threads of the external thread 11a of the shaft 11, the thread 13a of each roller 13 and the internal thread 12a of the nut 12 are set at "4 threads:1 thread:5 threads", the stroke amount of the shaft 11 becomes a single pitch of the external thread 1a, when the nut 12 is rotated once. That is, the lead at this time is the single pitch of the external thread 1a.

In the above conventional mechanism, the position of the center axis of the shaft with respect to the center axis of the nut and the position of the revolution axis of the rollers with respect to the center axis of the nut are determined by meshing of the threads, and the center axis of the shaft and the revolution axis of the rollers are easily displaced from the center axis of the nut. If the center axis of the shaft or the revolution axis of the rollers is displaced from the center axis of the nut, the respective inter-axis distances are changed, and the position of the contact surface of the respective threads provided on the shaft, rollers or the nut is changed, whereby the actual effective diameters of the respective threads are changed and stable and constant reduction gear ratio becomes difficult to be obtained.

Figure 7:
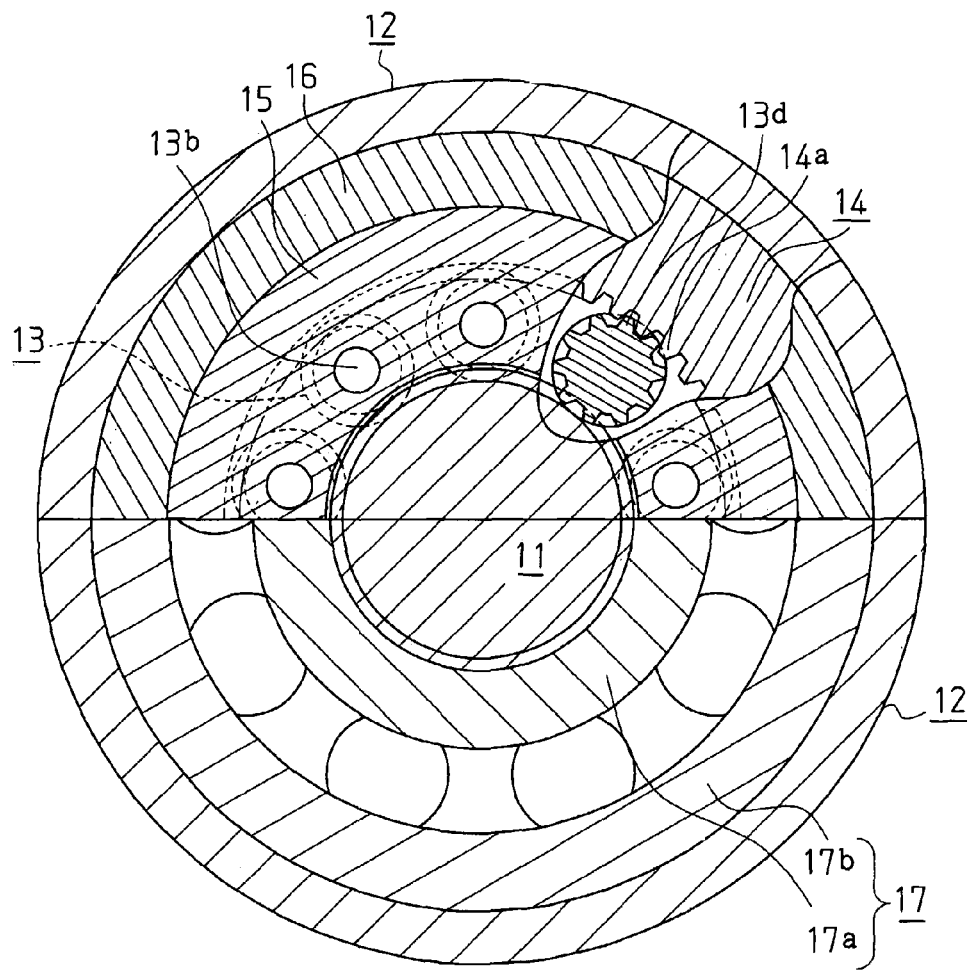
FIG. 7 is a cross-sectional view taken along line B-B of FIG. 5.

With this regard, in this embodiment, as shown in FIG. 7 showing the structure of the rotation/linear motion converting mechanism of the B-B section shown in FIG. 5, or FIG. 5, since the shaft 11 is supported by the bearings 17 fixed to the nut 12, the center axis of the nut 12 can be matched with the center axis of the shaft 11. Also, since the retainers 15 are rotatably supported by the bushings 16 similarly fixed to the nut 12, the center axis of the nut 12 and the center axis of each retainer 15, that is, the revolution axis of the rollers 13 can be matched with each other.

In this way, in the rotation/linear motion converting mechanism of this embodiment, since the position of the center axis of the shaft 11 with respect to the center axis of the nut 12 is determined by the bearings 17, and the position of the revolution axis of the rollers 13 with respect to the center axis of the nut 12 is determined by the bushings 16, the center axis of the shaft 11 and the revolution axis of the rollers 13 can be easily matched with the center axis of the nut 12. Therefore, the above-mentioned change in the respective inter-axis distances can be suppressed, the position of the contact surface of the respective threads is stabled and as a result, the actual effective diameters of the respective threads can be stabled. Thus, the reduction gear ratio of the rotation/linear motion converting mechanism determined by the ratio of the effective diameters of the respective threads can be maintained at a stable constant value, and the stroke amount of the shaft 11, when the nut 12 is rotated once, that is, the lead is also maintained at a stable constant value, which improves the lead accuracy.

As mentioned above, according to this embodiment, the following effects can be obtained.

(1) In the rotation/linear motion converting mechanism comprising the shaft 11 having the external thread 11a on its outer circumferential surface, the nut 12 having the internal thread 12a on its inner circumferential surface and the rollers 13 interposed between the outer circumferential surface of the shaft 11 and the inner circumferential surface of the nut 12 and having the threads 13a screwed with the external thread 11a and the internal thread 12a, respectively, the following members are provided. That is, the bearings 17 supporting the outer circumferential surface of the shaft 11 and fixed to the inner circumferential surface of the nut 12, the retainers 15 having the annular shape surrounding the shaft 11 and supporting both ends of the rollers 13, respectively, and the bushings 16 rotatably supporting the outer circumferential surface of each of the retainers 15 and fixed to the inner circumferential surface of the nut 12 are provided.

Therefore, the center axis of the shaft 11 and the revolution axis of the rollers 13 can be easily matched with the center axis of the nut 12, and thus, the position of the contact surface of the respective threads such as the external thread 11a, the internal thread 12a or the threads 13a can be stabilized, which stabilizes the actual effective diameters of the respective threads. Therefore, the reduction gear ratio of the rotation/linear motion converting mechanism can be maintained at a stable constant value, whereby the lead accuracy can be improved.

Each of the above embodiments may be modified as shown below.

In the first embodiment, the internal teeth 4a of each ring gear 4 may be directly formed on the inner circumferential surface of the nut 12. In this case, the ring gears 4 can be omitted. Similarly, in the second embodiment, the internal teeth 14a of the ring gears 14 may be directly formed on the inner circumferential surface of the nut 12. In this case, the ring gears 14 can be omitted.

The number of the ring gears 4 in the first embodiment or the ring gears 14 in the second embodiment may be one.

In the first embodiment, the disposed position of the spur gear 1b may be arbitrarily changed. The point is to provide a gear on the shaft 1 to be meshed with the gear provided on the rollers 3.

In the second embodiment, the first support member supporting the shaft 11 is the bearings 17, but the first support member is not limited to this. The member can be any other member as long as it supports the outer circumferential surface of the shaft 11 and is fixed to the inner circumferential surface of the nut 12 and is also capable of matching the center axis of the shaft 11 with the center axis of the nut 12. The bearings 17, which are anti-friction bearings, may be changed to sliding bearings such as the bushings 16, for example.

Also, the second support member supporting the retainers 15 in the second embodiment is the bushings 16, but the second support member is not limited to this. The member may be any other member as long as it rotatably supports the outer circumferential surface of the retainer 15 and is fixed to the inner circumferential surface of the nut 12 and is also capable of matching the revolution axis of the rollers 13 with the center axis of the nut 12. The bushings 16, which are sliding bearings, may be changed to anti-friction bearings such as the bearings 17, for example.

In the second embodiment, two bushings 16 are provided, but one of the bushings 16 may be omitted. Also, in the second embodiment, two bearings 17 are provided, but one of the bearings 17 may be omitted. Even in these cases, the center axis of the shaft 11 and the revolution axis of the rollers 13 can be matched with the center axis of the nut 12 to some extent.

In the first and the second embodiments, the gear provided on the outer circumferential surface of the shaft, the gear provided on the outer circumferential surface of each roller, and the gear, provided on the inner circumferential surface of the nut are made as spur gears, but they may be other forms of gears. They may be helical gears, double helical gears, for example.

In the rotation/linear motion converting mechanisms described in the first and the second embodiments, it is possible to convert the rotation of the shaft to the linear motion of the nut by supporting the nut to be not rotatable and to be movable in the axial direction and supporting the shaft to be rotatable and immovable in the axial direction.

The invention claimed is:

1. A rotation/linear motion converting mechanism including a shaft having a thread on an outer circumferential surface, a nut having a thread on an inner circumferential surface, and a roller arranged between the outer circumferential surface of the shaft and the inner circumferential surface of the nut, the roller having a thread threaded to the threads of the shaft and the nut, the rotation/linear motion converting mechanism converting rotation of one of the shaft and the nut to linear motion of the other, the mechanism comprising:
   a first toothed gear provided in a portion of the roller;
   a second toothed gear provided in a portion of the outer circumferential surface of the shaft that is different from the portion on which the thread is formed, the teeth of the second gear being meshed with the teeth of the first gear; and
   a third toothed ring gear provided in a portion of the nut and fixed to the inner circumferential surface of the nut, the teeth of the first gear being meshed with both the teeth of the third gear and the teeth of the second gear.

2. The mechanism according to claim 1, wherein the first gear is provided corresponding to a range where the second gear is relatively moved with respect to the roller.

3. The mechanism according to claim 1, wherein the first gear is integrally formed with the roller.

4. The mechanism according to claim 1, wherein the first gear is formed by a member separate from the roller and is assembled with the roller.

5. The mechanism according to claim 1, wherein the first gear is one of a pair of first gears each provided at an end of the roller in an axial direction.

6. The mechanism according to claim 1, wherein the ring gear has internal teeth forming the third gear.

7. The mechanism according to claim 1, wherein the second gear is integrally formed with the shaft.

8. The mechanism according to claim 1, wherein the second gear is formed by a member separate from the shaft and is assembled with the shaft.

9. The mechanism according to claim 1, wherein the second gear is provided at an end of the shaft in an axial direction.

10. The mechanism according to claim 1, wherein the first, second, and third gears are spur gears.

11. The mechanism according to claim 1, wherein the thread of the shaft is a multiple thread, the thread of the roller is a single thread, and the thread of the nut is a multiple thread with a number of threads different from that of the thread of the shaft.

12. A rotation/linear motion converting mechanism including a shaft having a thread on an outer circumferential surface, a nut having a thread on an inner circumferential surface, and a roller arranged between the outer circumferential surface of the shaft and the inner circumferential surface of the nut, the roller having a thread threaded to the threads of the shaft and the nut, the rotation/linear motion converting mechanism converting rotation of one of the shaft and the nut to linear motion of the other, the mechanism comprising:
- a first support member fixed to the inner circumferential surface of the nut, the first support member supporting the outer circumferential surface of the shaft;
- a plurality of retainers each having an annular shape surrounding the shaft, the retainers supporting both ends of the roller in an axial direction, respectively; and
- a second support member fixed to the inner circumferential surface of the nut, the second support member rotatably supporting the radially outer circumferential surface of at least one of the retainers, the outer circumferential surface of at least one of the retainers is rotatably supported by an inner circumferential surface of the second support member.

13. The mechanism according to claim 12, wherein at least one of the first and second support members is an anti-friction bearing.

14. The mechanism according to claim 12, wherein at least one of the first and second support members is a slide bearing.

15. The mechanism according to claim 12, wherein the first support member is an anti-friction bearing, and the second support member is a slide bearing.

16. The mechanism according to claim 12, wherein the thread of the shaft is a multiple thread, the thread of the roller is a single thread, and the thread of the nut is a multiple thread with a number of threads different from that of the thread of the shaft.

* * * * *